US010672133B2

United States Patent
Shibata et al.

(10) Patent No.: US 10,672,133 B2
(45) Date of Patent: Jun. 2, 2020

(54) MOVING OBJECT TRACKING DEVICE, DISPLAY DEVICE, AND MOVING OBJECT TRACKING METHOD

(71) Applicant: Kabushiki Kaisha Toshiba, Minato-ku (JP)

(72) Inventors: Tomoyuki Shibata, Kawasaki (JP); Yuto Yamaji, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/668,114

(22) Filed: Aug. 3, 2017

(65) Prior Publication Data

US 2018/0144481 A1 May 24, 2018

(30) Foreign Application Priority Data

Nov. 18, 2016 (JP) ................................ 2016-225527

(51) Int. Cl.
*G06T 7/223* (2017.01)
*G06K 9/00* (2006.01)
*H04N 7/18* (2006.01)

(52) U.S. Cl.
CPC .......... *G06T 7/223* (2017.01); *G06K 9/00288* (2013.01); *G06K 9/00295* (2013.01);
(Continued)

(58) Field of Classification Search
CPC ............ G06K 9/00288; G06K 9/00771; G06T 7/223; G06T 2207/30196; G06T 2207/30241; H04N 7/181
See application file for complete search history.

(56) References Cited

U.S. PATENT DOCUMENTS 4,893,182 A * 1/1990 Gautraud .............. G01S 3/7865
348/579
5,892,554 A * 4/1999 DiCicco ............... H04N 5/2723
348/584
(Continued)

FOREIGN PATENT DOCUMENTS

JP  2008-035301     2/2006
JP  2006-236255 A   9/2006
(Continued)

OTHER PUBLICATIONS

Joost, Van De Weijer, et al., "Learning Color Names for Real-World Applications," IEEE Transactions on Image Processing, vol. 18, No. 7, Jul. 2009, pp. 1512-1523.
(Continued)

*Primary Examiner* — Mekonen T Bekele
(74) *Attorney, Agent, or Firm* — Oblon, McClelland, Maier & Neustadt, L.L.P.

(57) ABSTRACT

According to an embodiment, a moving object tracking device includes a memory having computer executable components stored therein; and a processor communicatively coupled to the memory. The processor is configured to perform acquiring a plurality of images; generating a plurality of pieces of tracking information indicating information obtained by tracking a moving object included in the images; generating first associated tracking information obtained by first association targeting the plurality of pieces of tracking information having a mutual time difference equal to or smaller than a threshold; generating second associated tracking information obtained by second association targeting the first associated tracking information and the tracking information, not associated by the first association, based on authentication information for identifying the
(Continued)

moving object; and outputting the second associated tracking information.

12 Claims, 11 Drawing Sheets

(52) U.S. Cl.
CPC ..... *G06K 9/00369* (2013.01); *G06K 9/00771* (2013.01); *H04N 7/181* (2013.01); *G06T 2207/30196* (2013.01); *G06T 2207/30241* (2013.01)

(56) References Cited

U.S. PATENT DOCUMENTS

| | | | | |
|---|---|---|---|---|
| 8,620,070 | B2 * | 12/2013 | Hwang | H04N 17/002 |
| | | | | 382/165 |
| 8,724,919 | B2 * | 5/2014 | Pillman | G06T 5/003 |
| | | | | 382/173 |
| 8,928,772 | B2 * | 1/2015 | Pillman | G06T 5/004 |
| | | | | 348/222.1 |
| 9,430,923 | B2 * | 8/2016 | Kniffen | G08B 13/194 |
| 10,095,954 | B1 * | 10/2018 | Daliyot | G06T 7/292 |
| 2004/0257444 | A1 * | 12/2004 | Maruya | G08B 13/19645 |
| | | | | 348/169 |
| 2006/0093185 | A1 * | 5/2006 | Kato | G06K 9/00261 |
| | | | | 382/103 |
| 2011/0135153 | A1 * | 6/2011 | Tsurumi | G06K 9/00295 |
| | | | | 382/103 |
| 2011/0199461 | A1 * | 8/2011 | Horio | G06T 7/20 |
| | | | | 348/46 |
| 2012/0308126 | A1 * | 12/2012 | Hwang | H04N 17/002 |
| | | | | 382/165 |
| 2015/0091944 | A1 * | 4/2015 | Matsumoto | G06K 9/00771 |
| | | | | 345/633 |
| 2015/0146921 | A1 * | 5/2015 | Ono | G06K 9/00362 |
| | | | | 382/103 |
| 2015/0286866 | A1 * | 10/2015 | Kawaguchi | G06K 9/00624 |
| | | | | 382/103 |
| 2016/0284098 | A1 | 9/2016 | Okumura et al. | |
| 2016/0300486 | A1 * | 10/2016 | Liu | G08G 1/0125 |
| 2018/0033153 | A1 * | 2/2018 | Hirasawa | G06K 9/00771 |
| 2019/0122370 | A1 * | 4/2019 | Hayashi | G06T 7/20 |

FOREIGN PATENT DOCUMENTS

| | | |
|---|---|---|
| JP | 2009-110408 A | 5/2009 |
| JP | 4706535 | 6/2011 |
| JP | 2016-46639 A | 4/2016 |
| JP | 2016-057940 | 4/2016 |
| JP | 2016-126624 A | 7/2016 |
| JP | 2016-181743 | 10/2016 |
| WO | WO 02/086831 A2 | 10/2002 |

OTHER PUBLICATIONS

Tatsuo Kozakaya, et al., "Random Ensemble Metrics for Object Recognition," IEEE International Conference on Computer Vision, 2011, pp. 1959-1966.

* cited by examiner

| | ← | | 2016/10 | | → | |
|---|---|---|---|---|---|---|
| SUN | MON | TUE | WED | THU | FRI | SAT |
| 25 | 26 | 27 | 28 | 29 | 30 | 1 |
| 2 | 3 | 4 | 5 | 6 | 7 | 8 |
| 9 | 10 | 11 | 12 | 13 | 14 | 15 |
| 16 | 17 | 18 | 19 | 20 | 21 | 22 |
| 23 | 24 | 25 | 26 | 27 | 28 | 29 |
| 30 | 31 | | | | | |

500

MOVING OBJECT TRACKING DEVICE, DISPLAY DEVICE, AND MOVING OBJECT TRACKING METHOD

CROSS-REFERENCE TO RELATED APPLICATIONS

This application is based upon and claims the benefit of priority from Japanese Patent Application No. 2016-225527, filed on Nov. 18, 2016; the entire contents of which are incorporated herein by reference.

FIELD

Embodiments described herein relate generally to a moving object tracking device, a display device, and a moving object tracking method.

BACKGROUND

A moving object tracking device that tracks a moving object, detected from a plurality of camera videos, across cameras has been known. Among conventional moving object tracking devices, a configuration in which whether or not moving objects reflected in each image are the same is determined based on appearance of the moving object in the image to obtain each tracking result of the moving objects has been known.

In the conventional moving object tracking devices, however, the moving objects reflected in the respective images are associated with each other (tracking information is generated) based on the appearance of the moving object, and thus, it is difficult to cope with a change in clothing when the moving object is a pedestrian, for example. In addition, in the case of limiting to pedestrians, it is possible to associate the moving objects reflected in the respective images with each other using results obtained by recognizing a face even if the appearance varies due to different kinds of clothing and environmental change, but such association is possible only for sections where the face can be seen. It is difficult to track the moving object over a long period of time in the above conventional tracking device.

DETAILED DESCRIPTION

According to an embodiment, a moving object tracking device includes a memory having computer executable components stored therein; and a processor communicatively coupled to the memory. The processor is configured to perform acquiring a plurality of images; generating a plurality of pieces of tracking information indicating information obtained by tracking a moving object included in the images; generating first associated tracking information obtained by first association targeting the plurality of pieces of tracking information having a mutual time difference equal to or smaller than a threshold; generating second associated tracking information obtained by second association targeting the first associated tracking information and the tracking information, not associated by the first association, based on authentication information for identifying the moving object; and outputting the second associated tracking information.

Hereinafter, embodiments of a moving object tracking device, a display device, and a moving object tracking method according to the embodiment will be described in detail with reference to the accompanying drawings.

First Embodiment

Figure 1:
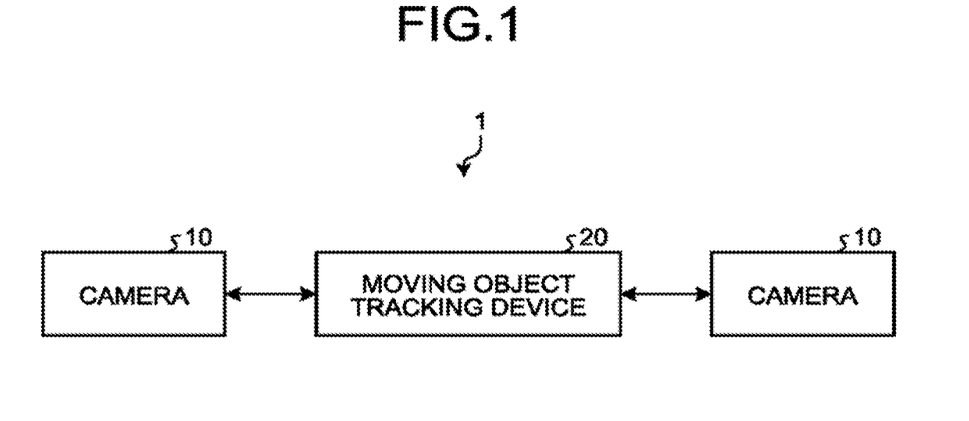
FIG. 1 is a diagram illustrating a configuration of a moving object tracking system according to a first embodiment.

FIG. 1 is a diagram illustrating an example of a schematic configuration of a moving object tracking system 1 according to the present embodiment. As illustrated in FIG. 1, the moving object tracking system 1 includes two cameras 10A and 10B and a moving object tracking device 20. In the following description, when the cameras 10A and 10B will be simply referred to as a "camera 10" when not distinguished from each other. Although the number of cameras 10 included in the moving object tracking system 1 is two in the example of FIG. 1, the embodiment is not limited thereto, but may be provided in a form of including three or more cameras 10 or a form of including a single camera 10. Each of the cameras 10 and the moving object tracking device 20 are connected to each other in a wireless or wired manner.

Figure 2:
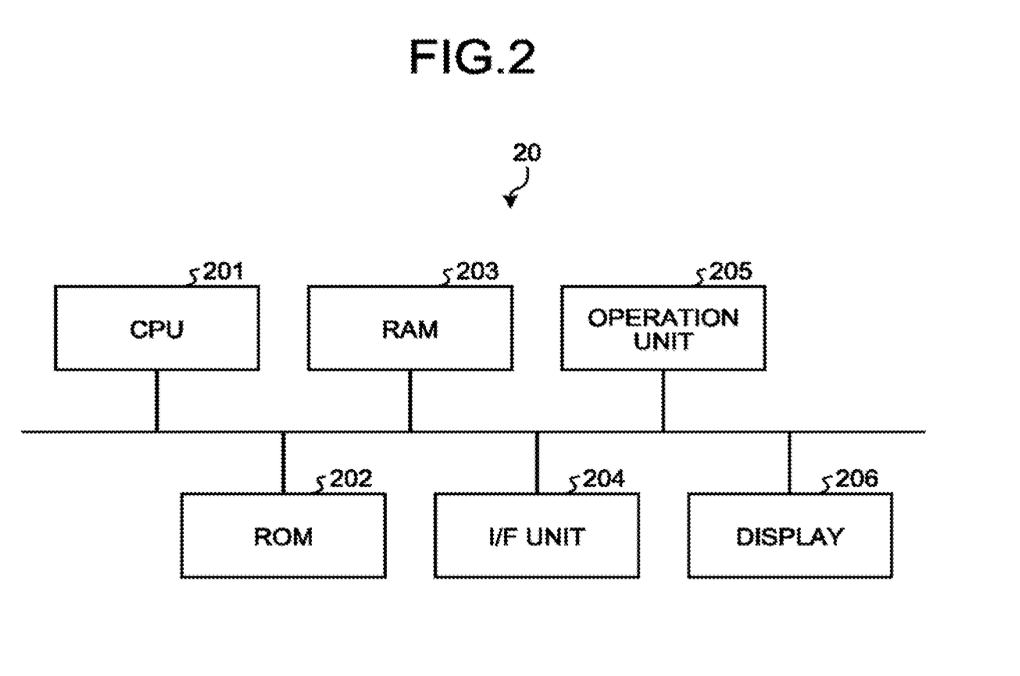
FIG. 2 is a diagram illustrating a hardware configuration of the moving object tracking device according to the first embodiment.

FIG. 2 is a diagram illustrating an example of a hardware configuration of the moving object tracking device 20. As illustrated in FIG. 2, the moving object tracking device 20 includes a CPU 201, a ROM 202, a RAM 203, an I/F unit 204, an operation unit 205, and a display 206.

The CPU 201 comprehensively controls an operation of the moving object tracking device 20. The CPU 201 executes various control programs recorded in the ROM 202 using a predetermined area of the RAM 203 as a work area to implement various functions provided in the moving object tracking device 20. Detailed content of the functions provided in the moving object tracking device 20 will be described later.

The ROM 202 is a non-volatile memory (non-rewritable memory) that stores programs, various kinds of setting information, and the like which relate to the moving object tracking device 20.

The RAM 203 is a storage, for example, an SDRAM or the like, functions as the work area of the CPU 201 and serves a role as a buffer or the like.

The I/F unit 204 is an interface configured for connection with an external device such as the camera 10. The operation unit 205 is a device configured to receive an operation of a user, and is configured using a mouse, a keyboard, or the like. The display 206 is a device that displays various kinds of information relating to the moving object tracking device 20, and is configured using, for example, a liquid crystal display or the like. The operation unit 205 and the display 206 may be a form of being configured in an integrated manner (for example, configured as a touch panel).

Figure 3:
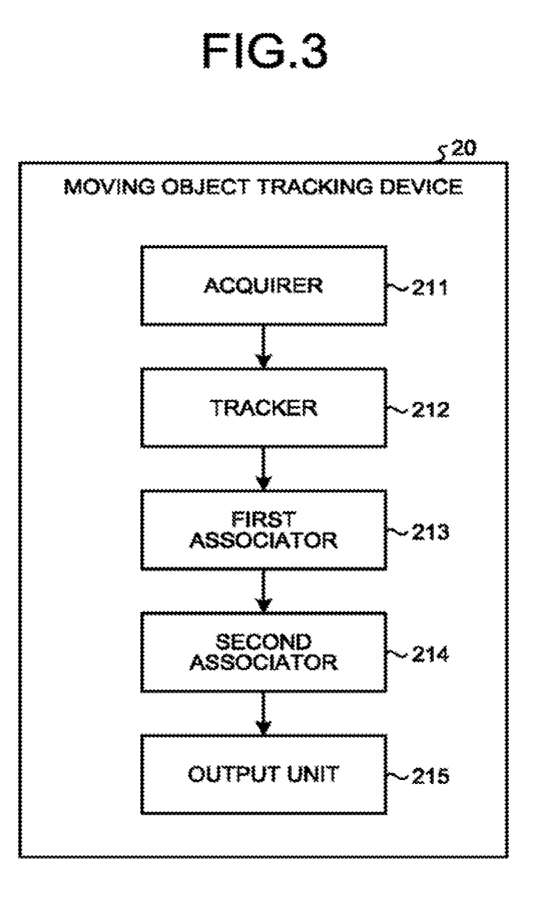
FIG. 3 is a diagram illustrating a function provided in the moving object tracking device according to the first embodiment.

FIG. 3 is a diagram illustrating an example of the functions provided in the moving object tracking device 20. As illustrated in FIG. 3, the moving object tracking device 20 includes an acquirer 211, a tracker 212, a first associator 213, a second associator 214, and an output unit 215. The functions relating to the present embodiment are mainly illustrated in the example of FIG. 3, but the functions provided in the moving object tracking device 20 are not limited thereto. In the present embodiment, the respective functions of the acquirer 211, the tracker 212, the first associator 213, the second associator 214, and the output unit 215 are implemented by the CPU 201 when executing the programs stored in the ROM 202 or the like, but the embodiment is not limited thereto. For example, at least a part of the functions may be implemented by a dedicated hardware circuit (a semiconductor integrated circuit or the like). In addition, the moving object tracking device 20 may be provided in a form of being partially or entirely present in a server.

The acquirer 211 acquires a plurality of images. More specifically, the acquirer 211 acquires a plurality of images (a plurality of temporally consecutive images) captured by the camera 10 from each of the cameras 10. For example, the acquirer 211 may be provided for each of the plurality of cameras 10 (the plurality of acquirers 211 corresponding to the plurality of cameras 10 on a one-to-one basis may be provided), or the single acquirer 211 that acquires the images from the respective cameras 10 may be provided.

The tracker 212 generates a plurality of pieces of tracking information indicating information obtained by tracking a moving object (reflected) included in the image acquired by the acquirer 211. The tracker 212 detects and tracks the moving objects reflected in the respective images with respect to an image group acquired by the acquirer 211, and generates the tracking information. Here, the tracker 212 generates the trashing information corresponding to each of the image groups captured by the respective cameras 10. In other words, it may be considered that one or more pieces of tracking information are generated for each of the cameras 10. In addition, the moving object is assumed to be a person (pedestrian) in this example, but may be, for example, a vehicle or the like without being limited thereto. Various known techniques can be used as a method of detecting and tracking the moving object among the images, and for example, a technique disclosed in Japanese Patent Application Laid-open No. 2014-186547 may be used. The tracking information may be considered as information which indicates a position of the moving object in each of the plurality of images (the plurality of temporally consecutive images) from which the same moving object is detected and which have a mutual time difference (a difference in imaged time) equal to or smaller than a predetermined value, and the imaged time. The moving object is no longer detected from the image when the moving object is out of an imaging range, for example, so that the tracking information is interrupted at this point in time.

The first associator 213 generates first associated tracking information obtained by association targeting a plurality of pieces of tracking information having the mutual time difference equal to or smaller than the threshold. Specifically, the first associator 213 collects the plurality of pieces of tracking information corresponding to the same moving object into one piece of information, and this collected result is referred to as the "first associated tracking information". The first associator 213 generates one or more pieces of the first associated tracking information. Here, when two pieces of tracking information, as targets, has a difference in imaged time (difference in imaged timing) equal to or larger than a certain value, appearance is highly likely to greatly vary therebetween, and thus, such information is excluded from targets of association by the first associator 213.

Figure 4:
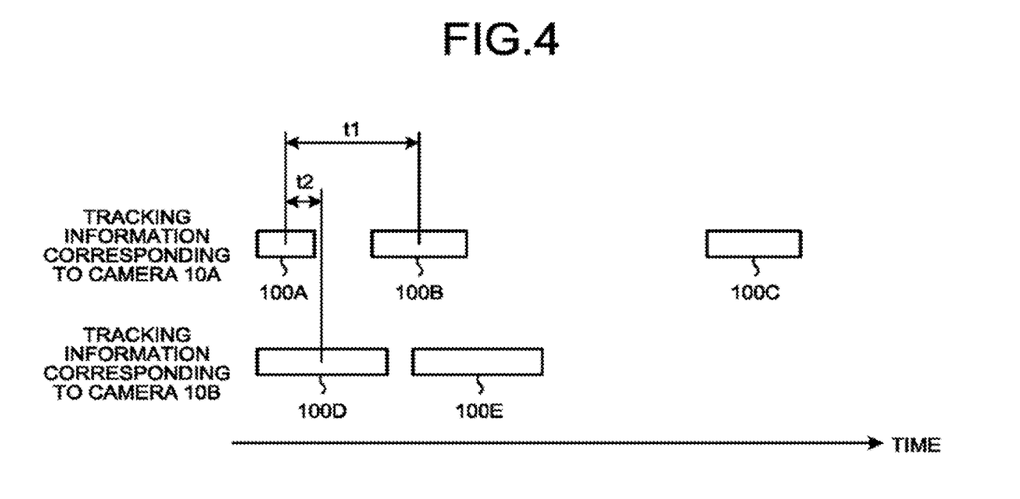
FIG. 4 is a view for describing association between pieces of tracking information according to the first embodiment.

For example, as illustrated in FIG. 4, assumed is a case where tracking information 100A, 100B, and 100C are generated as tracking information corresponding to the camera 10A, and tracking information 100D and 100E are generated as tracking information corresponding to the camera 10B. In this example, a time difference t1 between the tracking information 100A and 100B is equal to or smaller than the threshold. Thus, these two pieces of the tracking information 100 become targets of association by the first associator 213, and are associated with each other when a degree of similarity therebetween is equal to or larger than a reference value. Here, a description will be given by exemplifying a case where a difference between average values of the respective times included in the tracking information is taken as the time difference between the pieces of tracking information, but the embodiment is not limited thereto. For example, a difference between time of an end point of one tracking information and time of a start point of the other tracking time may be used.

In addition, when focusing on the tracking information 100A and the tracking information 100D, a time difference t2 between the tracking information 100A and 100D is equal to or smaller than the threshold in this example. Thus, these two pieces of the tracking information 100 become targets of association by the first associator 213, and are associated with each other when similarity therebetween is equal to or larger than a reference value. Similarly, the tracking information 100B and 100D, the tracking Information 100B and 100E, and the tracking information 100D and 100E become targets or association in this example. Meanwhile, a time difference between the tracking information 100C and each of the other tracking information 100A, 100B, 100D and 100E exceeds the threshold, and thus, any combination of the tracking information 100C and the other tracking information 100A, 100B, 100D or 100E does not become a target of association by the first associator 213.

In addition, it is conceivable that clothing changes such as putting on or off of an outer garment in a group of the cameras 10 under different environments. Thus, such a group is excluded, in advance, from targets of association by the first associator 213. In short, the first associator 213 generates the first associated tracking information for each group of the cameras 10 set in advance.

The first associator 213 associates the trace information and the trace information having the similarity equal to or higher than a threshold. Here, the similarity between the pieces of tracking information as targets of association by the first associator 213 is defined using similarity in appearance, a time difference, a distance between the cameras 10, and the like, and an authentication result using biometric information is also added when the biometric information such as a facial image or a fingerprint image is acquired from both the tracking information. In addition, when personal information of a person (pedestrian) such as an ID card is acquired in conjunction with a camera video at a passage gate or the like, these pieces of information can be also used.

In addition, the similarity in appearance of the pedestrian is calculated by, for example, multi-channelizing a person image (an area in which a person is reflected in an image) using a plurality of color spaces having tolerance to variation in environmental light, such as a YCbCr color space, an HSV color space, and a Color Names color space, performing Multi-Layer Block division of dividing each channel image into blocks with different number of divisions in a Y direction, calculating each of a histogram of values and a histogram of binary codes based on a difference value between adjacent pixels from each block, and performing extraction of a feature normalizing and concatenating all the blocks. Then, the similarity may be calculated using similarity in an identification space in which the same person learned by metric learning in advance is mapped to be close and another person is mapped to be distant.

Here, a person image acquired by three channels of RGB is converted into a plurality of color spaces so as to be multi-channelized. For example, the channel is expanded into seventeen channels in total including three channels in the YCbCr color space, three channels in the HBV color space, and eleven channels in the Color Names descriptor*. This expansion aims to absorb individual differences of cameras and variation in color information and luminance information of the acquired images caused by environmental variation, and it is known that variation on the color space are reduced with respect to the above-described variation (see Non-Patent Document "J. Van, Learning Coder Names for Real-World Applications, TIP, 18(7): 1512-1523, 2009)".

Figure 5:
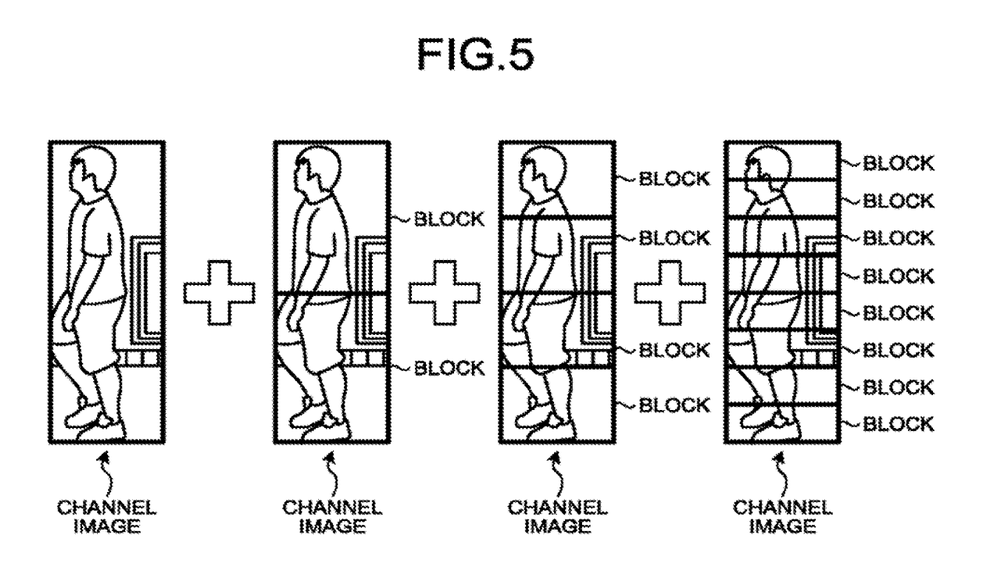
FIG. 5 is a view for describing a block of a channel image according to the first embodiment.

Next, block division is performed with a plurality of layers for each channel image. Although the histogram information is acquired from each block at the subsequent stage, it is possible to use position information when the division is performed in detail while influence caused by a positional deviation of a person rectangle is great, thereby increasing identifiability. Thus, division is performed step by step from detailed division to broad division. The division can be performed to be divided in the y-axis direction and the x-axis direction, but may be divided only in any one direction therebetween. Specifically, a plurality of areas called blocks are defined from the respective channel images for each person image. FIG. 5 is an image view of hierarchical division, and defines the plurality of areas called blocks, step by step, in four stages for one channel image.

Figure 6:
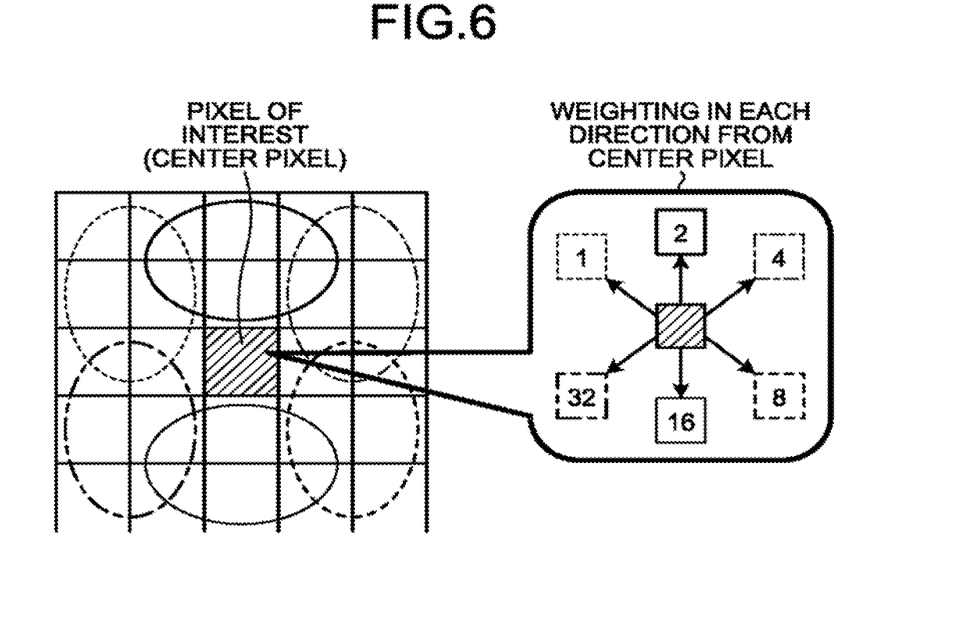
FIG. 6 is a view for describing an LBP according to the first embodiment.
Figure 7:
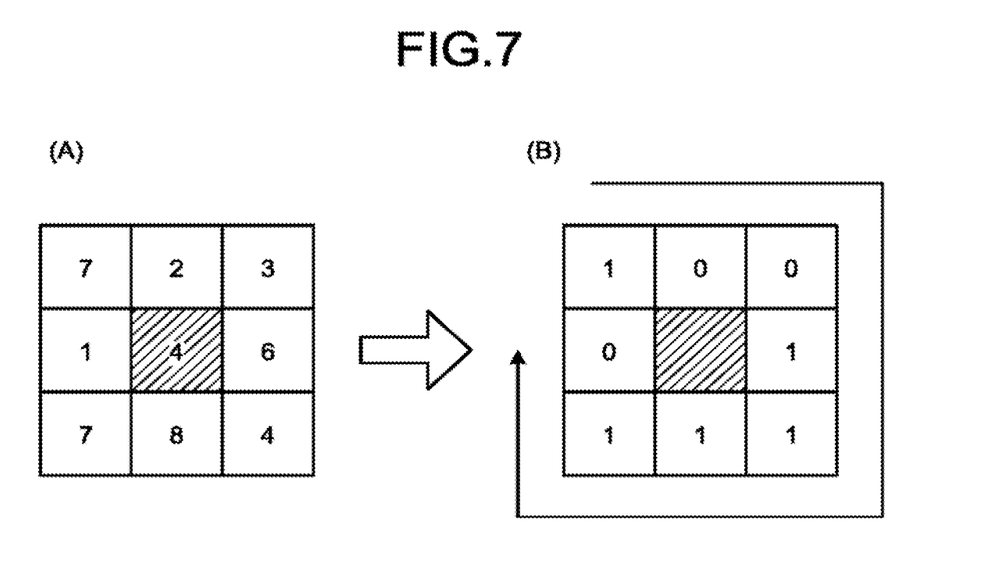
FIG. 7 is a view for describing the LBP according to the first embodiment.

Nest, the histogram information is extracted from the respective defined areas (blocks). The histogram to be extracted normalizes and concatenates a histogram feature, which indicates a frequency of occurrence of each value, and a feature which makes a histogram using binary codes, allocated based on values of a pixel of interest and a peripheral pixel, that is called a local binary pattern to obtain the histogram of a frequency of occurrence in a gradient direction with a peripheral value. As illustrated in FIG. 6, a luminance value of the pixel of interest and an average luminance value of pixels present in a direction are compared for each direction from the pixel of interest (center point), and coding is performed upon performing weighting depending on a result. For example, a luminance pattern illustrated in (A) of FIG. 7 is converted into a bit string in the direction indicated in (B) of FIG. 7. In this example, a luminance value of a peripheral pixel is converted to "0" when the luminance value of the peripheral pixel is lower than a luminance value of a center pixel, and a luminance value of a peripheral pixel is converted to "1" when the luminance value of the peripheral pixel is higher than a luminance value of a center pixel, but the embodiment is not limited thereto (the conversion may be performed in the opposite manner). The features in the number of dimensions, obtained by combining a bin number of the histogram of values and a bin number of the histogram of the LBP, is obtained from the respective blocks (areas).

Next, features corresponding to the number of channels× the number of blocks, extracted from the respective blocks, are normalized and concatenated, to extract a high-order feature vector. Metric learning is performed to perform conversion, in advance, into a feature space in which the same moving object becomes close and a different moving object becomes distant, and the acquired conversion matrix is used to take a feature vector (d-dimension) obtained by converting the high-order feature vector (D-dimension) as a feature vector of each person image. Several methods are proposed for the metric learning, and in general, only a conversion matrix in a dimension corresponding to the number of categories, which are desirably obtained by division, is calculated in most methods. However, it is possible to calculate a conversion matrix in an arbitrary number of dimensions when REMetric* is used, for example (see "T. Kozakaya, Random Ensemble Metrics for Object Recognition, International Conference on Computer Vision (ICCV), 2011").

The similarity between the respective person images can be defined by normalized cross-correlation between the above-described two feature vectors. In general, the tracking information has a plurality of person images, and thus, it is possible to define the similarity between a plurality of images and a plurality of images. A maximum value among all combinations may be used as the similarity between the pieces of tracking information or an average value thereof may be used as the similarity between the pieces of tracking information. Alternatively, principal component analysis is performed on a plurality of feature vector sequences obtained relating to each piece of tracking information to calculate a subspace. This subspace is a space that expresses each moving object expressing variation in appearance, and thus, similarity between the respective subspaces among the pieces of tracking information is calculated by a mutual subspace method and taken as the similarity between the tracking information. Further, the first associator 213 associates the tracking information and the tracking information having the similarity equal to or higher than the reference value, and generates one or more pieces of the first associated tracking information.

The second associator 214 generates second associated tracking information obtained by association targeting the first associated tracking information and tracking information, which has not been associated by the first associator 213, based on authentication information for identifying the moving object. The authentication information includes biometric information. More specifically, the biometric information includes a facial image or a fingerprint image. In addition, the authentication information may include personal information of a person (pedestrian) such as an ID card.

In this example, the second associator 214 extracts facial images, respectively, for the first associated tracking information and the tracking information, which are the targets of association, and generates the second associated tracking information by associating the first associated tracking information and the first associated tracking information, the first associated tracking information and the tracking information, or the tracking information and the tracking information which have the extracted faces images matching each other. Accordingly, the tracking information 100C that has not been associated by the first associator 213 is also associated (collected as one piece of tracking information) with the first associated tracking information (or tracking information that has not been associated by the first associator 213) including the facial image extracted from the tracking information 100C in FIG. 4, for example. The invention is not limited thereto, and may be provided in a form of performing association by performing the similar authentication using a fingerprint image. In addition, when personal information of a person such as an ID card is acquired in conjunction with an image imaged by the camera 10 at a pass gate or the like, the second associator 214 may be provided in a form of performing association using these kinds of information. In the above-described manner, the second associated tracking information is obtained for each moving object reflected in the image. Here, it is known recognition performance for facial recognition is improved by performing authentication using a set of facial images acquired from the same person at a plurality of angles and under a plurality of illumination environments. While a facial image obtained from the tracking information, which is an analysis result from a single camera video, has little variation, the facial image obtained from the above-described first associated tracking information, which is an analysis result from a plurality of camera videos, is a facial image that has greater variation. Thus, the facial recognition performance is further improved when the first associated tracking information is used. As for calculation of similarity in the facial recognition, similarity between two facial images may be defined using a predetermined feature vector and a maximum value among all combinations may be defined as similarity between sets, or similarity may be calculated using mutual subspaces, which is similar to the above-described calculation of similarity between the person images.

Figure 8:
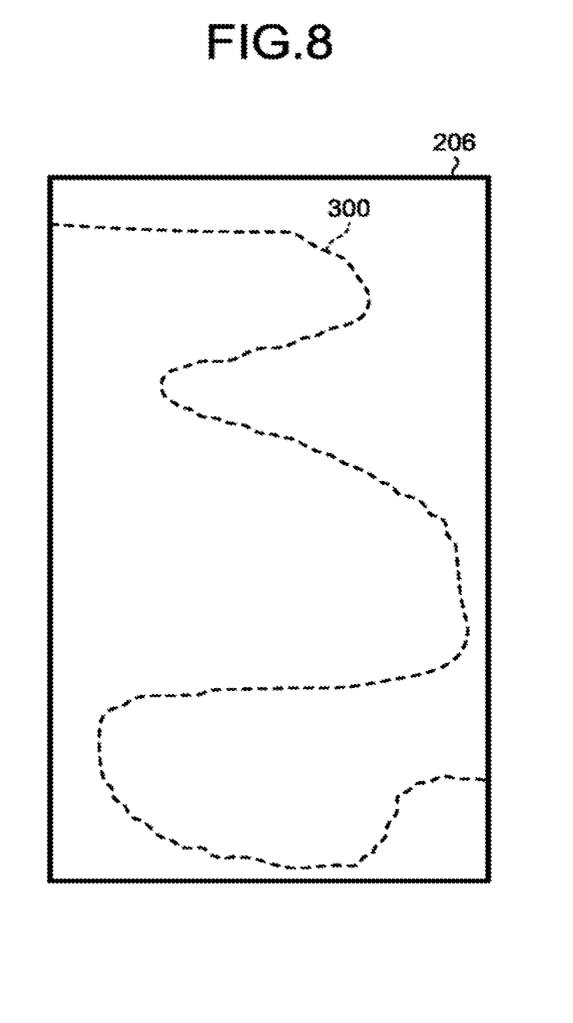
FIG. 8 is a view illustrating an example of output according to the first embodiment.

The output unit 215 outputs the second associated tracking information. For example, as illustrated in FIG. 8, the output unit 215 can also perform control to display a movement trajectory 300 corresponding to the second associated tracking information on the display 206.

As described above, one or more pieces of the first associated tracking information, obtained by association targeting a plurality of pieces of tracking information having the mutual time difference equal to or smaller than the threshold, are generated, and then, the second associated tracking information, obtained by association targeting the one or more pieces of first associated tracking information and tracking information, which has not been associated as the first associated tracking information, based on the authentication information for identifying the moving object, is generated and output in the present embodiment. In other words, it is possible to obtain tracking results over a longer period of time by creating one or more first associated tracking information, obtained by associating short-term tracking information and short-term tracking information on the same moving object, and generating the second associated tracking information, obtained by association based on the authentication information, relating to the first associated tracking information and the first associated tracking information which have not been associated due to the time difference therebetween, and the tracking information (tracking information missed from association by the first associator 213) which have not been associated as the first associated tracking information. Therefore, it is possible to achieve an advantageous effect trust tracking of a moving object over a long period of time becomes possible according to the present embodiment.

Modified Example of First Embodiment

The function of the tracker 212 may be a form of being provided in the camera 10, for example. In this case, the moving object tracking device 20 is provided in a form of having a function of acquiring a tracking information group instead of the acquirer 211 and the tracker 212. In short, the moving object tracking system 1 may be provided in a form of including the acquirer 211, the tracker 212, the first associator 213, the second associator 214, and the output unit 215.

Second Embodiment

Figure 9:
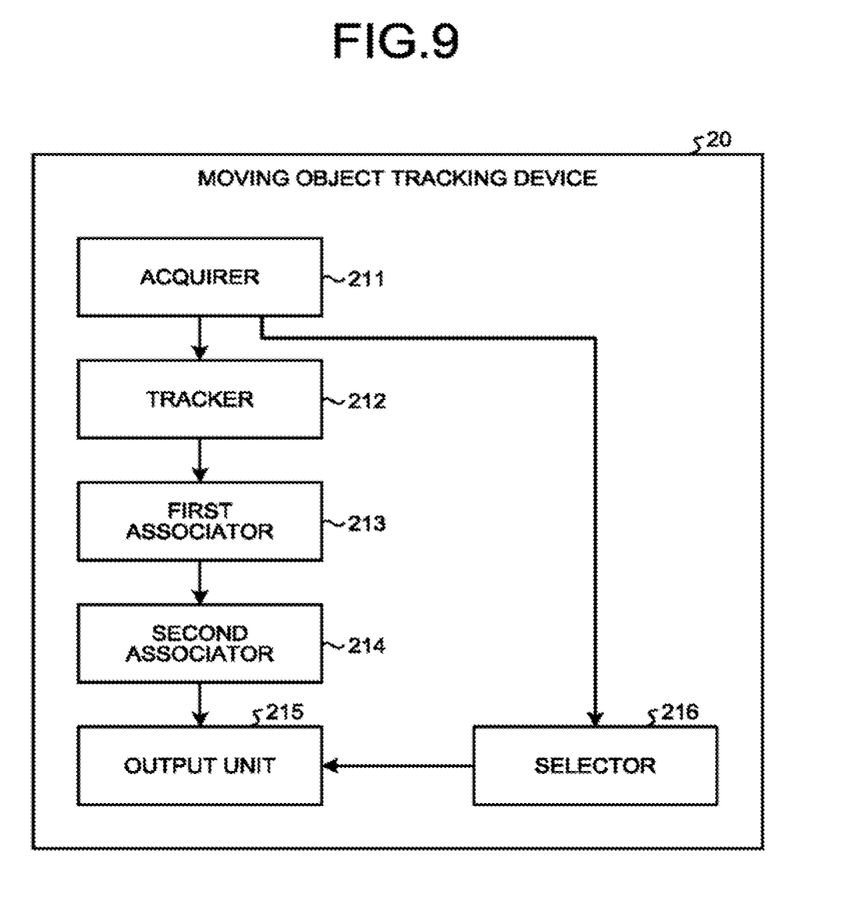
FIG. 9 is a diagram illustrating a function provided in a moving object tracking device according to a second embodiment.

Next, a second embodiment will be described. A description on common parts as the above-described first embodiment will be suitably omitted. In the present embodiment, FIG. 9 is a diagram illustrating an example of functions provided in the moving object tracking device 20 according to the second embodiment. As illustrated in FIG. 5, the moving object tracking device 20 further includes a selector 216, which is different from the above-described first embodiment. The selector 216 selects any moving object included in a plurality of temporally consecutive images. A selection method is arbitrary. For example, the selector 216 can select a pedestrian reflected in an image in accordance with a touch operation or a mouse operation with respect to the image acquired by the acquirer 211, or may select any pedestrian in accordance with a touch operation or a mouse operation among pedestrians (people), reflected in images, retrieved with a facial image as a query, and then, displayed in the descending order of similarity. In addition, for example, person images (pedestrians) cut out from the images may be displayed in an aligned manner, and any person image (pedestrian) may be selected in accordance with a touch operation or a mouse operation.

Figure 10:
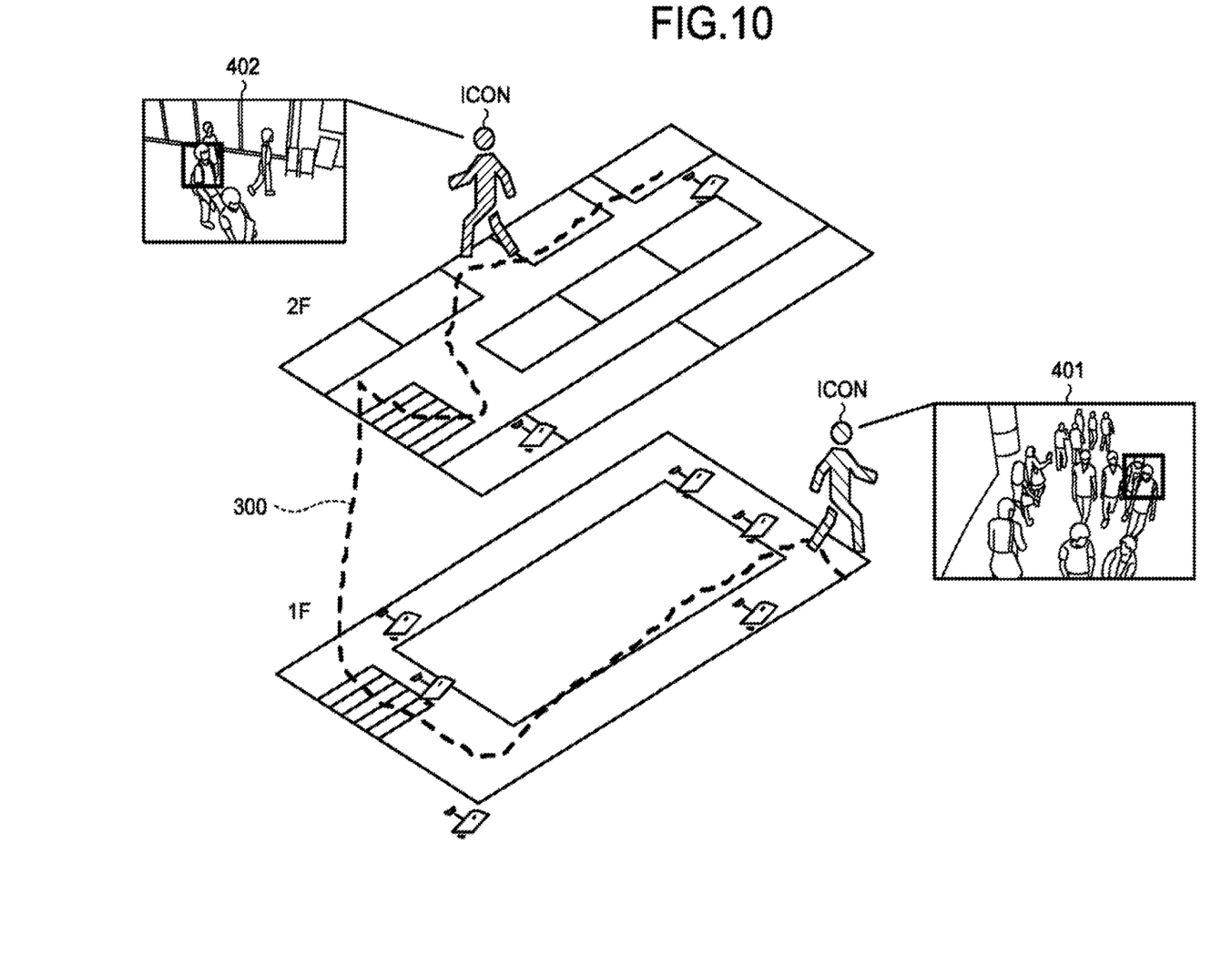
FIG. 10 is a view illustrating an example of a display mode according to the second embodiment.

The output unit 215 according to the present embodiment performs control to display a movement trajectory of a pedestrian (an example of a moving object), selected by the selector 216 (a movement trajectory corresponding to the second associated tracking information of the pedestrian), and one or more images, which correspond to one or more points (may be fixed or may be arbitrarily changeable in accordance with designation by a user) on the movement trajectory, in an aligned manner. For example, as illustrated in FIG. 10, it is possible to display the movement trajectory 300, an image 401, which corresponds to a point corresponding to the latest time in the movement trajectory 300, and an image 402, which corresponds to a point corresponding to an arbitrary time in the past, in an aligned manner. In the example of FIG. 10, icons of pedestrians are displayed together with the images. Here, the output unit 215 functions as a "display controller". Further, the moving object tracking device 20 corresponds to a "display device".

The function of the output unit 215 and the function of the selector 216 among the functions illustrated in FIG. 9, for example, may be extracted and mounted to another device. In this case, the other device functions as the "display device".

Modified Example of Second Embodiment

Figure 11:
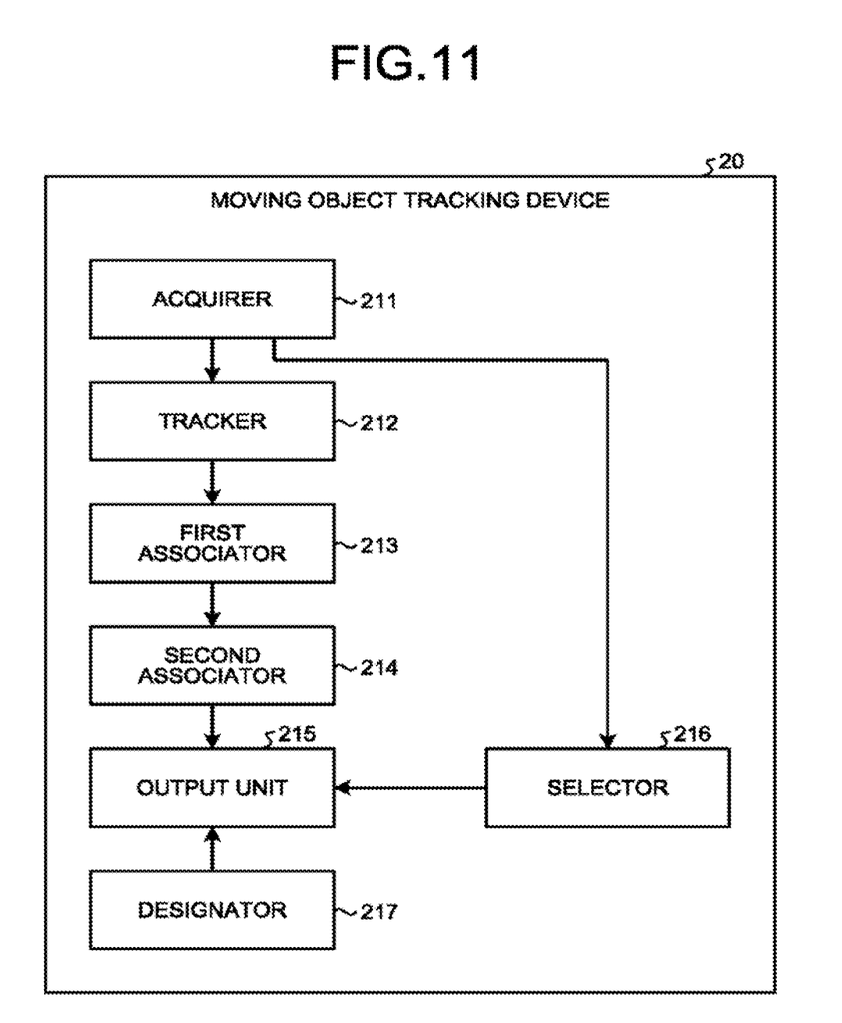
FIG. 11 is a diagram illustrating functions provided in a moving object tracking device according to a modified example of the second embodiment.
Figure 12:
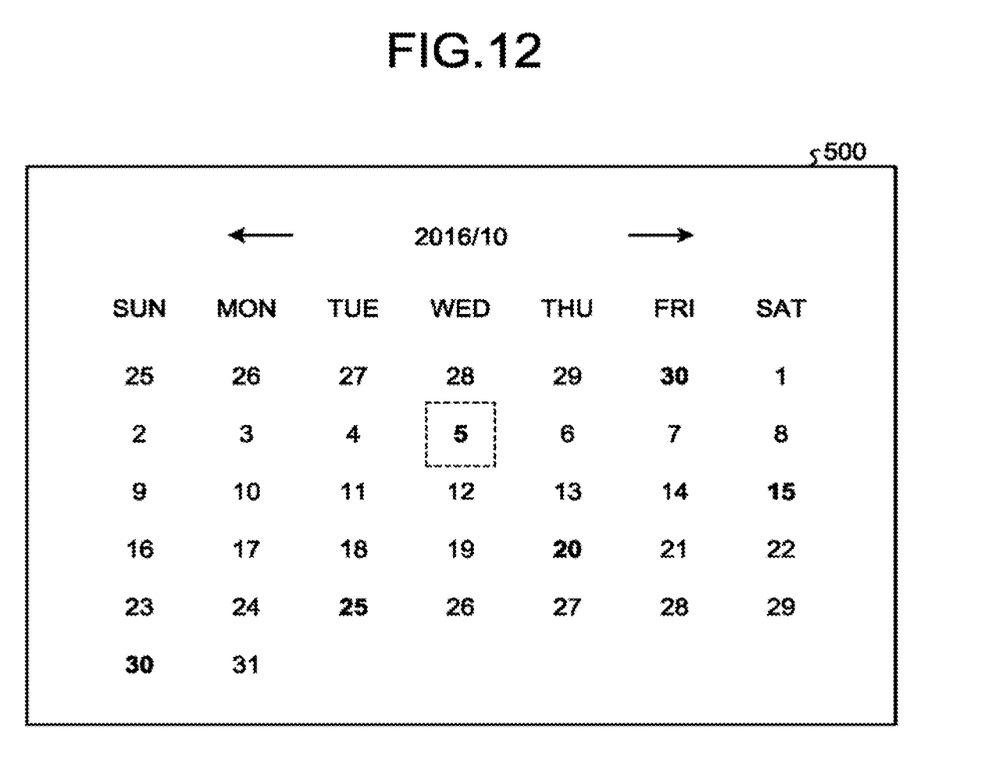
FIG. 12 is a view illustrating an example of a calendar image according to the second embodiment.

FIG. 11 is a diagram illustrating an example of functions provided in the moving object tracking device (display device) 20 according to a modified example of the second embodiment. As illustrated in FIG. 11, the moving object tracking device 20 further includes a designator 217. The designator 217 designates a period. A method of designating the period is arbitrary. For example, when a calendar image 500 illustrated in FIG. 12 is displayed and a touch operation or a mouse operation with respect to any date inside the calendar image 500 is received, the designator 217 can designate a period (one day) corresponding to the date.

Figure 13:
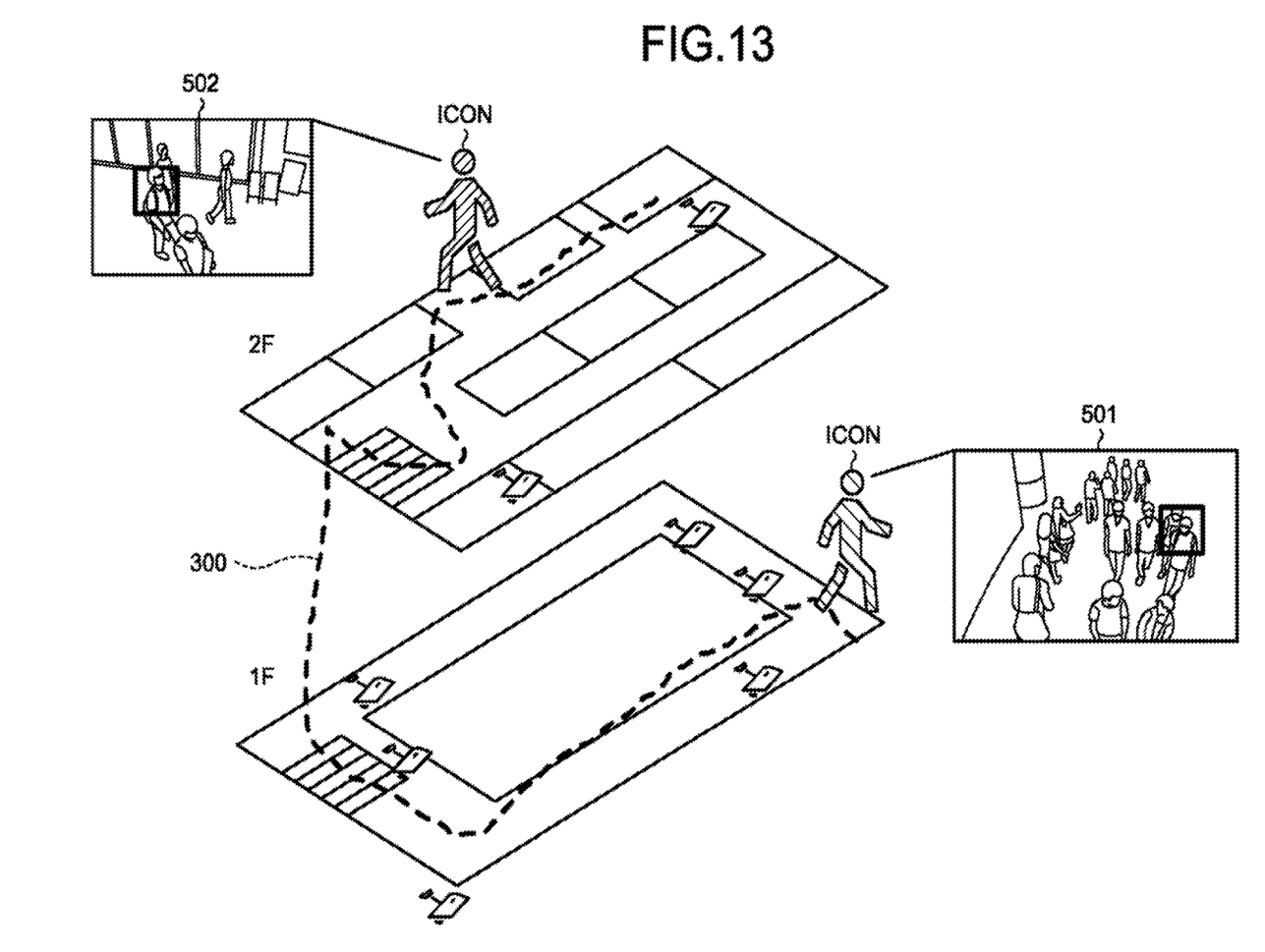
FIG. 13 is a view illustrating an example of a display mode according to the modified example of the second embodiment.

The output unit 215 performs control to display a movement trajectory, which corresponds to a period designated by the designator 217, of a pedestrian selected by the selector 216 and one or more images corresponding to one or more points on the movement trajectory in an aligned manner. For example, when a date of "Oct. 5, 2016" in the calendar image 505 of FIG. 12 is designated, the output unit 215 can also display the movement trajectory 300, which corresponds to the designated date, of the pedestrian selected by the selector 216, an image 501, which corresponds to a point corresponding to the latest time in the movement trajectory 300, and an image 502, which corresponds to a point corresponding to an arbitrary time in the past, in an aligned manner as illustrated in FIG. 13. In the example of FIG. 13, icons of pedestrians are displayed together with the images.

Figure 14:
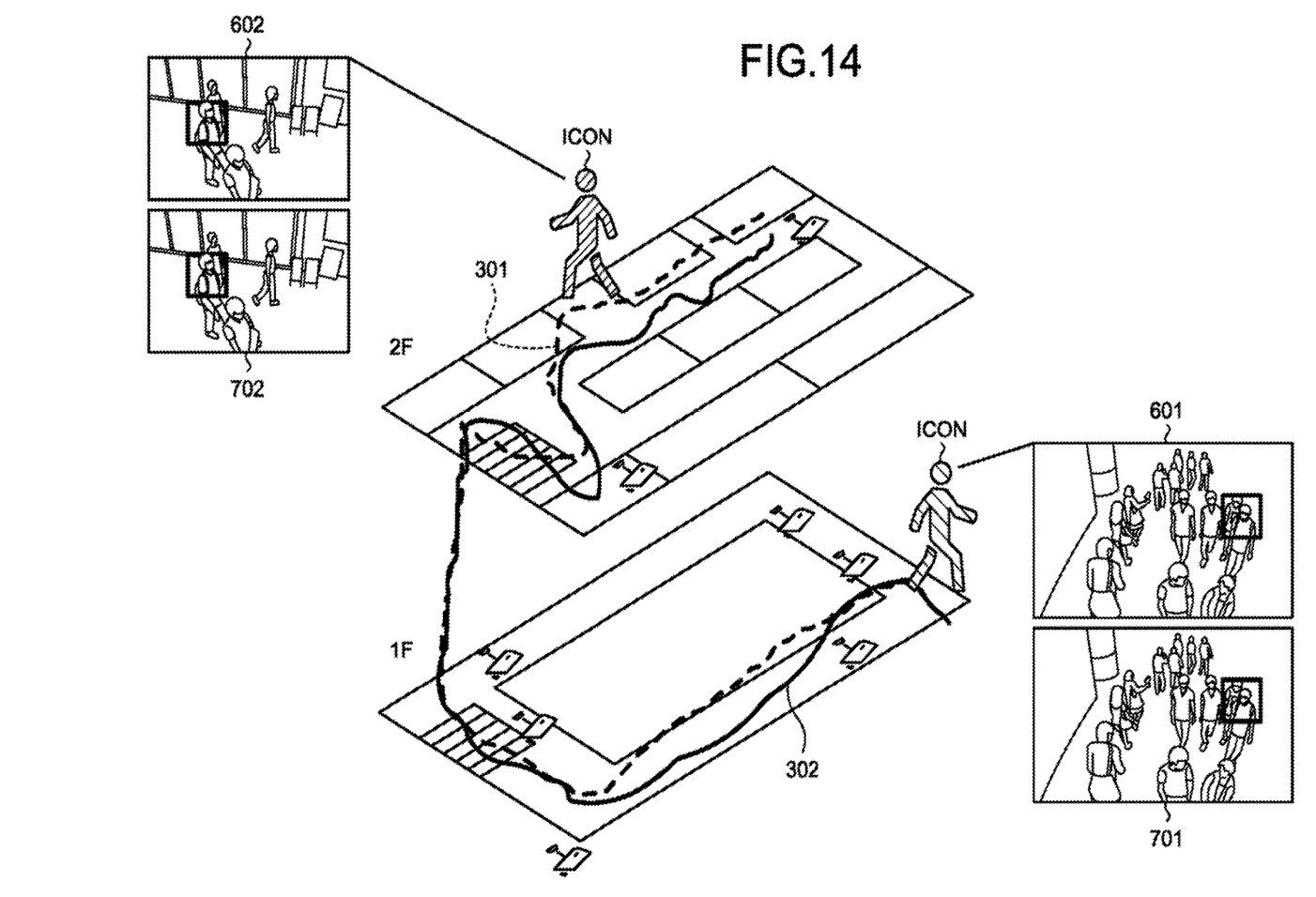
FIG. 14 is a view illustrating an example of the display mode according to the modified example of the second embodiment.

In addition, the designator 217 can also designate a plurality of periods. In this case, the output unit 215 performs control to display a movement trajectory of a pedestrian selected by the selector 216 and one or more images corresponding to one or more points on the movement trajectory, in an aligned manner, for each of the plurality of periods designated by the designator 217. For example, assumed is a case where the date of "Oct. 5, 2016" and a date "Oct. 15, 2016" in the calendar image 500 of FIG. 12 are designated. In this case, the output unit 215 can display a movement trajectory 301, which corresponds to "Oct. 5, 2016", of the pedestrian selected by the selector 216, an image 601, which corresponds to a point corresponding to the latest time in the movement trajectory 301, and an image 602, which corresponds to a point corresponding to an arbitrary time in the past, in an aligned manner, and display a movement trajectory 302, which corresponds to "Oct. 15, 2016", an image 701, which corresponds to a point corresponding to the latest time in the movement trajectory 302, and an image 702, which corresponds to a point corresponding to an arbitrary time in the past, in an aligned manner as illustrated in FIG. 14.

In addition, it may be configured such that the program executed by the moving object tracking device 20 according to the respective embodiments and modified examples described above is stored in a computer connected to the network such as the internet and is provided through download via the network. In addition, it may be configured such that the program executed by the moving object tracking device 20 according to the respective embodiments and modified examples described above is provided or distributed via the network such as the Internet. In addition, it may be configured such that the program executed by the moving object tracking device 20 according to the respective embodiments and modified examples described above is provided in the state of being incorporated in a non-volatile recording medium such as a ROM in advance.

Further, the respective embodiments and modified examples described above can be combined in an arbitrary manner.

While certain embodiments have been described, these embodiments have been presented by way of example only, and are not intended to limit the scope of the inventions. Indeed, the novel embodiments described herein may be embodied in a variety of other forms; furthermore, various omissions, substitutions and change in the form of the embodiments described herein may be made without departing from the spirit of the inventions. The accompanying claims and their equivalents are intended to cover such forms or modifications as would fall within the scope and spirit of the inventions.

What is claimed is:

1. A moving object tracking device comprising:
   a memory having computer executable components stored therein; and a processor communicatively coupled to the memory, the processor configured to perform
   acquiring a plurality of images;
   generating a plurality of pieces of tracking information indicating information obtained by tracking a moving object included in the images;
   generating first associated tracking information obtained by first association targeting the plurality of pieces of tracking information having a mutual time difference equal to or less than a threshold, the first association using similarity between pieces of the tracking information, the similarity being defined using at least a distance between cameras or a similarity in appearance calculated by at least one of multi-channelizing, multi-layer block division, and histogram, and the first associated tracking information being obtained by associating short-term tracking information with short-term tracking information on the moving object;
   generating second associated tracking information obtained by second association targeting the first associated tracking information and the tracking information that is not associated by the first association and that has a mutual time difference exceeding the threshold based on authentication information for identifying the moving object; and
   outputting the second associated tracking information.

2. The device according to claim 1, wherein
   the acquiring acquires the plurality of images captured by a camera for each of a plurality of cameras, and
   the generating first associated tracking information generates the first associated tracking information for each predetermined set of the cameras.

3. The device according to claim 1, wherein
   the moving object is a person, and
   the authentication information includes biometric information.

4. The device according to claim 3, wherein the biometric information includes a facial image or a fingerprint image.

5. The device according to claim 1, wherein
   the moving object is a person, and
   the authentication information includes personal information of the person.

6. The device according to claim 1, wherein the first association associates the tracking information and the tracking information having the similarity equal to or greater than a threshold.

7. A moving object tracking method comprising:
acquiring a plurality of images;
generating a plurality of pieces of tracking information indicating information obtained by tracking a moving object included in the images;
generating first associated tracking information obtained by first associating the tracking information and the tracking information targeting the plurality of pieces of tracking information having a mutual time difference equal to or less than a threshold, the first associating using similarity between pieces of the tracking information, the similarity being defined using at least a distance between cameras or a similarity in appearance calculated by at least one of multi-channelizing, multi-layer block division, and histogram, and the first associated tracking information being obtained by associating short-term tracking information with short-term tracking information on the moving object;
generating second associated tracking information obtained by second associating the first associated tracking information and the first associated tracking information that has a mutual time difference exceeding the threshold based on authentication information for identifying the object; and
outputting the second associated tracking information.

8. The method according to claim 7, wherein
the acquiring acquires the plurality of images captured by a camera for each of a plurality of cameras, and
the generating first associated tracking information generates the first associated tracking information for each predetermined set of the cameras.

9. The method according to claim 7, wherein
the moving object is a person, and
the authentication information includes biometric information.

10. The method according to claim 9, wherein the biometric information includes a facial image or a fingerprint image.

11. The method according to claim 7, wherein
the moving object is a person, and
the authentication information includes personal information of the person.

12. The method according to claim 7, wherein the first associating associates the tracking information and the tracking information having the similarity equal to or greater than a threshold.

* * * * *